Jan. 27, 1970  R. R. CANDOR ET AL  3,491,386
LAUNDRY APPARATUS OR THE LIKE
Filed Dec. 14, 1967  8 Sheets-Sheet 1

INVENTORS
ROBERT R. CANDOR &
JAMES T. CANDOR

BY
*Candor & Candor*

THEIR ATTORNEYS

Jan. 27, 1970  R. R. CANDOR ET AL  3,491,386
LAUNDRY APPARATUS OR THE LIKE
Filed Dec. 14, 1967  8 Sheets-Sheet 3

INVENTORS
ROBERT R. CANDOR &
JAMES T. CANDOR

BY *Candor & Candor*

THEIR ATTORNEYS

Jan. 27, 1970   R. R. CANDOR ET AL   3,491,386
LAUNDRY APPARATUS OR THE LIKE
Filed Dec. 14, 1967   8 Sheets-Sheet 4

INVENTORS
ROBERT R. CANDOR &
JAMES T. CANDOR

BY

*Candor & Candor*

THEIR ATTORNEYS

Jan. 27, 1970  R. R. CANDOR ET AL  3,491,386
LAUNDRY APPARATUS OR THE LIKE
Filed Dec. 14, 1967  8 Sheets-Sheet 5

INVENTORS
ROBERT R. CANDOR &
JAMES T. CANDOR
BY
Candor & Candor
THEIR ATTORNEYS

INVENTORS
ROBERT R. CANDOR &
JAMES T. CANDOR

BY

*Candor & Candor*

THEIR ATTORNEYS

INVENTORS
ROBERT R. CANDOR &
JAMES T. CANDOR

BY *Candor & Candor*

THEIR ATTORNEYS

Jan. 27, 1970  R. R. CANDOR ET AL  3,491,386
LAUNDRY APPARATUS OR THE LIKE
Filed Dec. 14, 1967  8 Sheets-Sheet 8

INVENTORS
ROBERT R. CANDOR &
JAMES T. CANDOR

BY

Candor & Candor

THEIR ATTORNEYS

United States Patent Office 3,491,386
Patented Jan. 27, 1970

3,491,386
LAUNDRY APPARATUS OR THE LIKE
Robert R. Candor, Miami Township, Ohio (5940 Munger Road, Dayton, Ohio 45459), and James T. Candor, Washington Township, Ohio (5440 Cynthia Lane, Dayton, Ohio 45429)
Continuation-in-part of application Ser. No. 635,848, May 3, 1967. This application Dec. 14, 1967, Ser. No. 690,636
The portion of the term of the patent subsequent to June 3, 1986, has been disclaimed
Int. Cl. D06f 21/04
U.S. Cl. 8—158    23 Claims

ABSTRACT OF THE DISCLOSURE

The disclosure relates to improved means for treating laundry or the like by tumbling the laundry in a supporting and rotating drum-like member and causing fluid to be forced through the laundry while the same is being compressed between the supporting drum and a nozzle means disposed within the drum, the nozzle means either forcing the fluid from the nozzle means through the compressed laundry or drawing the fluid through the laundry into the nozzle means and the nozzle means having one or more opening means therein for the passage of such fluid.

---

This application is a continuation-in-part application of our copending parent patent application, Ser. No. 635,848, filed May 3, 1967, now Patent No. 3,447,174.

This invention relates to a washing machine with a surface effect air pressure or suction baffle means.

The invention is applicable to "washing" or "dry cleaning" and the like. These terms are used herein interchangeably.

A feature of this invention includes means for applying air pressure for agitating, wringing, and evaporatively drying clothes and other laundry or materials in a washing machine, or a dry cleaning machine.

Another feature of this invention includes the use of a surface effect, or ground effect, air pressure baffle for agitating the clothes and other laundry or other materials during the washing, wringing, and evaporatively drying the clothes, etc.

Another feature of this invention includes the use of a flexible air trapping baffle for producing such washing, wringing, and drying operation.

Another feature of this invention includes the use of a rigid baffle means on the perforated drum to cooperate with the air trapping baffle for the purpose of washing, wringing, and evaporatively drying the clothes and other laundry, or materials.

Another feature includes the use of the foregoing features for the purpose of dry cleaning the clothes.

Another feature of this invention is to provide a nozzle means for direct contact with the laundry to cause fluid flow directly through the contacted laundry and nozzle means.

Other features of this invention are apparent from this description, the accompanying drawings, and the appended claimed subject matter.

Referring first to FIGURES 1–5, a stationary, imperforate, cylindraceous outer drum 20 is provided to retain washing or dry cleaning liquid for washing, dry cleaning, or otherwise treating materials such as laundry or articles to be washed and/or dry cleaned. An inner, cylindraceous, perforate drum 22 is rotatably mounted in the stationary drum 20, within which the articles to be treated, 24, are placed. These articles may be introduced into and removed from the apparatus through an access opening 26, which may be placed at one end of the drums 20 and 22 in a manner well known to those skilled in the art. Such opening 26 may be provided with suitable covering or door means, also well known to those skilled in the art, for the purpose of retaining the articles to be treated and the liquid introduced therein, also as is well known to those skilled in the art.

Under certain conditions the drum 20 may be rotatable, but for the purpose of brief description it may be referred to as a stationary drum, with the understanding that, under certain conditions, the drum 20 may be rotatable.

A surface effect air pressure applying baffle 28 may be placed in the perforated drum 22 and may be so mounted that it can rotate simultaneously with such drum 22. In the embodiment shown in FIGURES 1–4, such baffle 28 may be provided with a relatively rigid plate support 30, which may be supported or secured to one or both of the end members of the rotatable drum 22. For example, such plate may be secured to the end wall 32 of the rotatable drum 22. A similar wall 34 may be provided at the other end of the drum 22, and such wall may have an access opening 36 for introduction and removal of clothes and the like, as is obvious to those skilled in the art.

Figure 5:
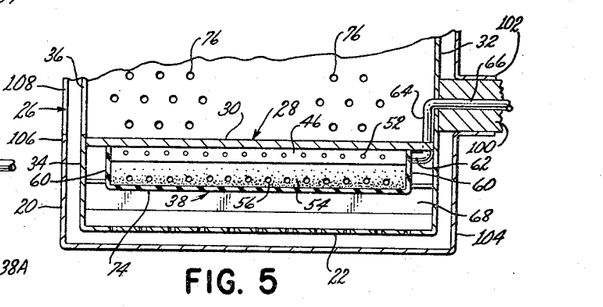
FIGURE 5 is a longitudinal, horizontal cross section of the baffle supporting portion of FIGURES 1–4.

The plate 30 may also be secured to the other end wall 34, which may be the front end wall of the perforate drum 22, which may be provided with an access opening 36, of the character heretofore described. As shown in FIGURE 5, the plate support 30 may be secured to the plate 30 rotates with the drum 32.

Figure 1:
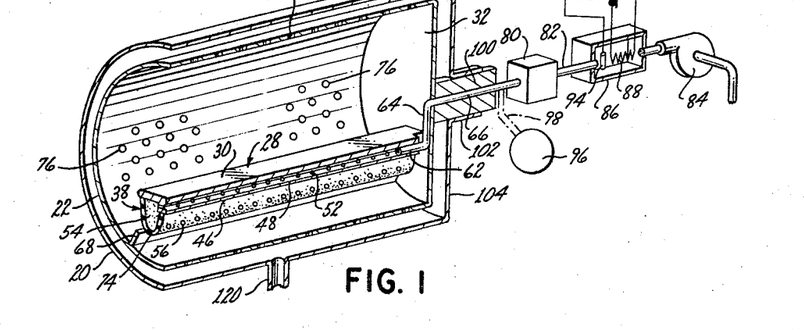
FIGURE 1 is a perspective view of one embodiment of this invention, partly in cross section.
Figure 2:
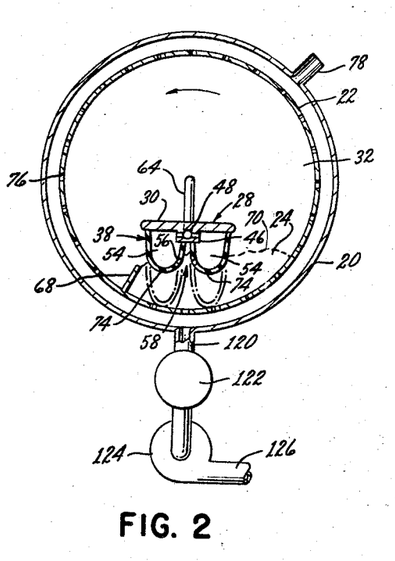
FIGURE 2 is a cross section transverse to FIGURE 1, in vertical cross section.

A flexible, air pressure applying curtain 38 may be secured to the plate 30 in such a manner that the curtain 38 tends to hang downwardly from the plate 30, when the plate 30 is in its lowermost position, as shown in FIGURES 1 and 2.

The curtain 38 may be a single curtain, or a double curtain, depending how the central part of the curtain is produced. The outer edges 40, FIGURE 4, may be secured to the outer edges 42 of the plate 30. The inner edges 44 of the curtain 38 may be united together, if desired, or they may be separately secured to a central air distributing bar 46, which is provided with a central conduit 48, which has one or more branches 50 with one or more openings 52 for distributing the air to the interior or interiors 54 of the curtain 38. The curtain 38 may have small openings 56 for permitting the air to discharge from the interior or interiors 54 into the central plenum portion 58 of the curtain 38.

The curtain 38 may have end closure 60, FIGURE 5, to retain the air in the interior or interiors 54.

The central conduit 48 of the plate support 30 may be connected to a compressed air supply pipe 62, which may have an offset portion 64 connected to a central portion 66, which may be connected to an air supply means to be described.

Figure 3:
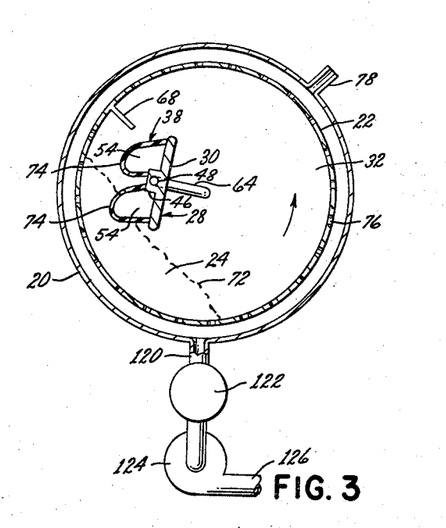
FIGURE 3 is a view similar to FIGURE 2 and showing the perforated drum in another position.
Figure 4:
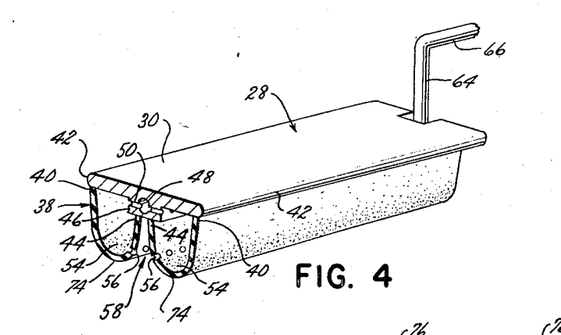
FIGURE 4 is a detailed view of one embodiment of the surface effect pressure baffle.

If desired, a rigid longitudinal baffle 68 may be provided on the drum 22 on the rear or following side of the curtain 38, it being understood that the drum 22, as shown in FIGURES 2 and 3, rotates in a counterclockwise direction. The purpose of the baffle 68 is to cooperate with the curtain 38 to cause the articles to be treated to form into an accumulation 24, as indicated by the dotted line 70 in FIGURE 2, which is partly under the curtain 38 in the position shown in FIGURE 2, to cause such accumulation of clothes 24 to rise with the curtain 38 on the right hand of FIGURE 2 and to continue completely around with the curtain 38 until it reaches some position on the falling side, as shown in FIGURE 3, where the clothes may fall partly or wholly from the curtain 38, as indicated by the line 72.

The curtain 38 is of such a character that it tends to retain compressed air from the pipe construction 62–66 to press the curtain 38 downwardly to form lobes 74, which tend to press the clothes downwardly against perforated drum 22 and also allow the compressed air to discharge from the lobes 74 into the central plenum part 58 of the curtain construction and then through the clothes and through the openings 76 in the drum 22. The air then may be allowed to escape, such as through a discharge pipe 78, which may be vented to any desired place, such as to the exterior of the building in which the apparatus is being used, if desired.

The pipe 62–66 may be supplied with compressed air, which, if desired, may also be heated. For example, the pipe 66 may pass through a packing box or the like, 80, of well-known construction, which allows the pipe section 66 to rotate with the drum 22 and allows the stationary pipe section 82 to be stationary and to be connected to the air compressor 84. The construction is such that the compressor 84 may supply compressed air through the stationary pipe 82, packing box 80, to the rotatable part 66 of the supply sections 62, 64, 66. If desired, the pipe 82 may pass through or be a part of a chamber 86, which may be heated by an electric heater 88, which heats the air which is pumped by the pump 84 and supplies the same in heated condition to be caused to pass through the clothes 24 and dry the same at the proper time. The electric heater 88 may be automatically controlled by a timer operated switch 90, which energizes the heater during the desired time of the washing operation to produce the drying action. Additionally, the heater 88 may be controlled by the thermostatic switch 92, which may be responsive to the air temperature in the chamber 86, such as by a thermostatic bulb 94.

The perforated drum 22 may be driven at a suitable rotational speed, such as to cause the tumbling action heretofore described, and which is diagrammatically indicated in FIGURES 2 and 3. For example, such drum 22 may be rotated by the motor 96, which actuates a speed reduction transmission 98, of any well-known construction, and which may be manually or automatically adjustable, so that it drives the rotatable shaft 100, which partly or wholly supports the drum 22 and drivingly rotates the same. The shaft 100 may be rotated within the bearing 102, which is connected to the rear wall 104 of drum 20.

The drum 20 may be provided with a front wall 106, having an opening 108 for insertion and removal of articles to be treated.

The openings 36 and 108 of FIGURE 5 may be provided with suitable sealing means and cover means, which are well know in the art, and which need not be specifically disclosed herein.

In the embodiment shown in FIGURE 6, the inner drum 22 may be a perforated drum somewhat similar to the drum 22 heretofore described, except that it may have reduced or tapered walls 109 and 110, which cause the clothes to be moved toward the longitudinal center of the apparatus, directly under a circular plate support 30A, which is supported within the drum 22A to rotate therewith, in a manner substantially similar to that described in connection with drum 22. The drum 22A may be provided with a baffle 68A, which may extend throughout the length of the drum 22 or may be less wide at the central part than at the ends 112, as desired.

Figure 6:
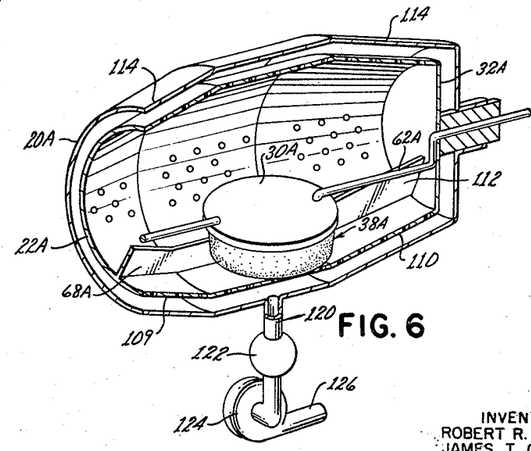
FIGURE 6 is an embodiment somewhat similar to FIGURES 1–4, and using a substantially circular surface effect baffle and/or a close centering drum construction.

The baffle 68A may have higher wall ends, as shown at 112 in FIGURE 6. The outer drum 20A of FIGURE 6 may have slanting walls 114, similar to slanting walls 109 and 110 of the inner drum 22.

The curtain 38A may be similar to the curtain 38, except that the curtain 38A may be circular in horizontal cross section at all parts thereof, including the plate 30A.

The supply pipe 62A may enter the plate 30A and may discharge into any part of the curtain 38A, without the necessity of a distributing device, since the air can circulate completely around the interior of the curtain 38A.

Figure 7:
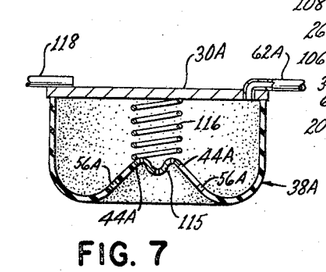
FIGURE 7 is an enlarged cross section of the circular plate of FIGURE 6.

The inner edge 44A, FIGURE 7, of the curtain 38A may be provided with an opening which is covered by a perforated wall 115, which may be a perforated plate or a wire mesh construction, which may be resiliently supported from the plate 30A by any spring construction 116, which permits the inner edge 44A to rise and fall slightly as desired. Openings 56A may be provided, if desired, to correspond to openings 56 of the previous figures, or they may be omitted.

The plate 30A may be supported by any suitable means from the end walls of the drum 22A. For example, the pipe 62A may be constructed to be supported from the end wall 32A of the drum 22A. A suitable rod 118 may extend from the plate 30A to the front end wall of the rotatable drum 22A such front wall not being shown, but which may be otherwise similar to the front wall 34 of FIGURE 5, except of smaller diameter, in corresponding fashion to rear wall 32A because of the slanting walls 109 and 110.

The outer drums 20 and 20A may be provided with a suitable drain 120 at the bottommost part, which may be connected to a drain valve 122. This valve 122 may be solenoid operated to open and close at the proper time. The valve 122 may be connected to a water pump 124, the discharge portion 126 of which may be connected by a suitable flexible hose or the like to a drain or laundry tub, as is obvious.

In the operation of FIGURE 1, clothes may be introduced through the openings 36 and 108 and the various parts of the apparatus may be controlled by a suitable timer in the usual manner which controls the desired operation of the various parts of the machine. The timer may cause the drum 22 to be rotated at a slow speed, such that it allows the articles to be washed or cleaned to be caught by the baffle 68 and be accumulated at 70 under the curtain 38, when the parts reach the lowermost position of FIGURE 2. The curtain 38 contacts the top of a portion of the clothes 24 in some such manner as indicated by the dotted line 70 of FIGURE 2, so that the compressed air from the pipes 66, 64, and 62 enters the lobes 54 of the curtain 38 and passes through the openings 56 into the cleaning chamber 58 from whence the air is forced through the clothes 24 and may pass out through openings 76 to the drum 20 and out through the discharge pipe 78 to the exterior.

During the initial washing operation, no compressed air need be introduced into the baffle 28 and, the baffle 68 may lift and drop the clothes during the washing operation. On the other hand, if desired, air may be introduced into the curtain 38 during the washing operation and this will aid in the lifting and dropping of the clothes from and into the water at the bottom of the apparatus. The valve 122 is closed during this time.

The drain valve 122 may be opened, and the pump 124 operated, if necessary. The liquid is then drained from the tub 20. The tub 22 may be rotated or allowed to continue to rotate with the curtain 38 inflated by the compressed air. This action lifts and drops the clothes as indicated respectively by the FIGURES 2 and 3 so that different parts of the clothes are subjected to the compressed air from the curtain 38 repeatedly. The action can continue indefinitely to a complete drying of the clothes. The compressed air may be heated continuously, or only during the time of the evaporative drying of the clothes, when the switch 90 may be closed, to energize the heater 88 for the desired time, with or without automatic cycling by the thermostat 92.

Substantially the same action takes place in the embodiment of FIGURES 6 and 7, as is obvious. A feature in FIGURES 6 and 7 is that the clothes are concentrated at the central part during the dropping operation, because of the slanting sides 109 and 110. The curtain 38A may thus be smaller than the curtain 38, which will concentrate the action of the curtain 38A to a relatively small area.

Figure 8:
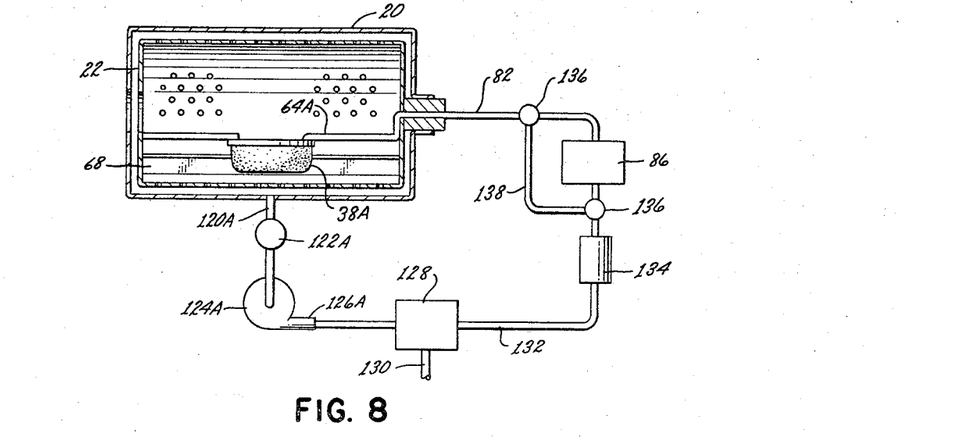
FIGURE 8 is a diagrammatic showing of a combined water pump and air blower for circulating air and/or water through the surface effect baffle.

The water pumps 124 of FIGURES 2, 3, 6 may be combined water and air circulators, as shown at 124A in FIGURE 8. Such circulator 124A discharges into a three-way valve 128 which may be solenoid and timer operated, if desired.

The three-way valve 128 may discharge into a drain through pipe 130 to empty the tub 20. The valve 128 may discharge into pipe 132 which discharges through filter 134 and into heating chamber 86 of FIGURE 1 and then into pipe 64 of FIGURE 1 or 64A of FIGURE 6, etc.

This permits water to be circulated through the clothes by the flexible curtain constructions 38, 38A, etc., during the washing action. It also permits air to be circulated through the clothes by the curtain constructions 38, 38A, etc., during the water, moisture and vapor extraction portions of the wash-dry operation.

If desired, valves 136 may be provided to by-pass the water through pipe 138 around the heating chamber, if desired. Such valves 136 may be solenoid and timer operated, if desired.

Figure 9:
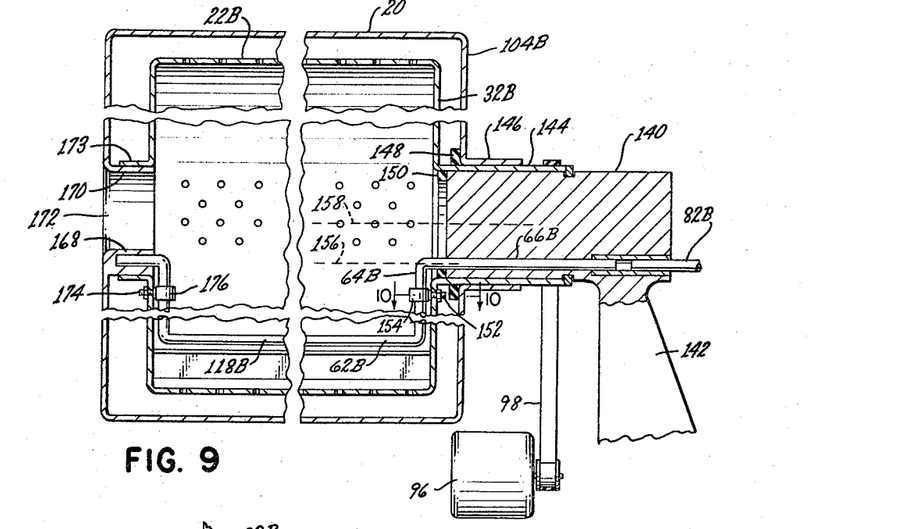
FIGURE 9 is a cross section of a rear support for an eccentrically supported rotatable baffle and cylindrical drum.
Figure 10:
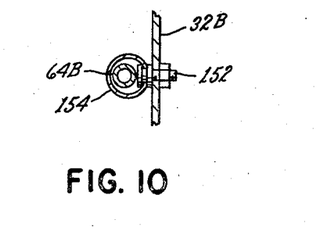
FIGURE 10 is an enlarged fragmentary cross section taken on line 10—10 of FIGURE 9.

In FIGURE 9, parts which generally correspond to previously described parts are shown with a suffix B instead of either no suffix or suffix A, as is obvious.

There is a stationary pipe 82B, a longitudinally rotatable pipe 66B and a radially rotatable pipe 64B.

The pipes 66B and 82B are supported in a stationary cylindrical block 140 which is supported on a pedestal 142.

The block 140 rotationally supports the rotatable sleeve 144 which rotationally supports the rotatable end wall 32B of the rotatable perforate drum 22B.

The stationary cylindrical drum 20 has a stationary rear end wall 104B with a stationary sleeve 146 surrounding the rotatable sleeve 144 and having a seal 148 between the end wall 104B and sleeve 144. Another seal 150 may be provided between the rotatable sleeve 144 and stationary cylinder block 140.

A bolt 152 is fixed to the end wall 32B and has a rotatable ring 154 which loosely receives the pipe 64B so that the ring 154 causes the pipe 64B and pipe 62B to rotate about the pipe 66B as an axis 156. The drum 22B rotates about the axis 158 eccentrically to the rotation of the pipe 62B. When the pipe 62B has rotated to its uppermost position it will be farther away from the cylindrical wall 22B, as illustrated in FIGURE 11.

The pipe 62B may support a surface effect carrying member 160 with a flexible impervious surface effect curtain 162 which is closest to the drum 22B at one part of the revolution and farthest away at 180°.

Figure 11:
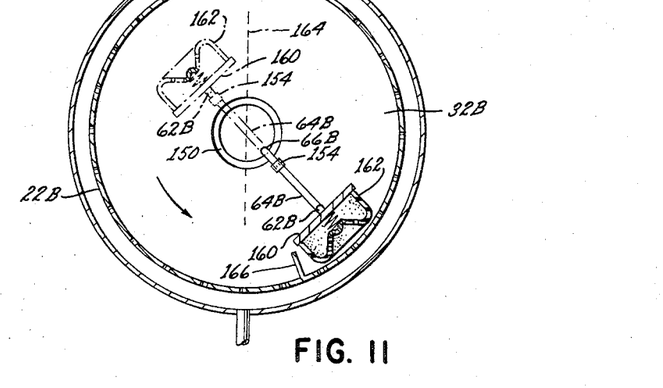
FIGURE 11 is a diagrammatic transverse cross section of FIGURE 9.

In FIGURE 11, the pipe 66B may be at about from 30° to 45° away from the vertical plane 164 on the rising side of the drum 22B at approximately the lower right quadrant. The member 160 likewise is closest at from 30° to 45° from such vertical plane. Such member 160 will be farthest away from drum 22B at from 30° to 45° on the top-most position at plane 164, at approximately the upper left quadrant.

A longitudinal baffle 166 may be placed on the trailing side of curtain 162.

As the drum 22 rotates, the baffle 166 gathers an accumulation of clothes at its bottom part of rotation and carries them to be pressed under curtain 162 with pressure air being applied to and through the clothes at the lower right quadrant. The curtain 162 will be removed from the clothes at the upper left quadrant sufficiently to release the clothes to allow them to fall and redistribute themselves before they are again gathered up by the baffle 166 near the bottom of rotation and then pressed by the curtain 162 at the lower right quadrant.

If desired, the pipe 62B may carry the member 160 somewhat as is done in FIGURE 6 at 30A with another support member 118B at left end of FIGURE 9.

The support member 118B may be received in a stationary bearing member 168 in the inward flange 170 which also forms the clothes receiving opening 172.

The drum 22B may have an outward flange 173 which rotates about the inward flange 170 to complete the clothes receiving opening.

A bolt 174 and loose ring 176 may have a similar action on support 118 that is produced by bolt 152 and ring 154 on pipe 64B at the right end of FIGURE 9.

While the previously described embodiments of this invention disclose the nozzle means or air baffle as being utilized to force fluid from the nozzle means through the laundry compressed between the nozzle means and rotating supporting structure for a moisture removing operation, it is to be understood that the nozzle means of this invention can be utilized to draw fluid through the compressed laundry into the nozzle means for such moisture removing operation whereby the rotating supporting structure can be liquid retaining rather than foraminous as previously described. Of course, in such embodiment of this invention, the rotating supporting structure could also be foraminous if desired.

In particular, reference is now made to FIGURES 12–15 wherein another laundry apparatus of this invention is generally indicated by the reference numeral 200 and comprises a rotatable liquid retaining cylindrical drum means 201 having an opening 202 at one end wall 203 thereof to insert laundry and the like into the drum 201 and to remove the same therefrom, the access opening 202 being adapted to be opened and closed by suitable door means in an outer surrounding casing for the apparatus 200 (not shown) in any suitable manner. For example, see the copending patent application, Ser. No. 308,262, filed Sept. 11, 1963, now Patent No. 3,344,447, for details of various means of opening and closing the access opening 202.

Figure 12:
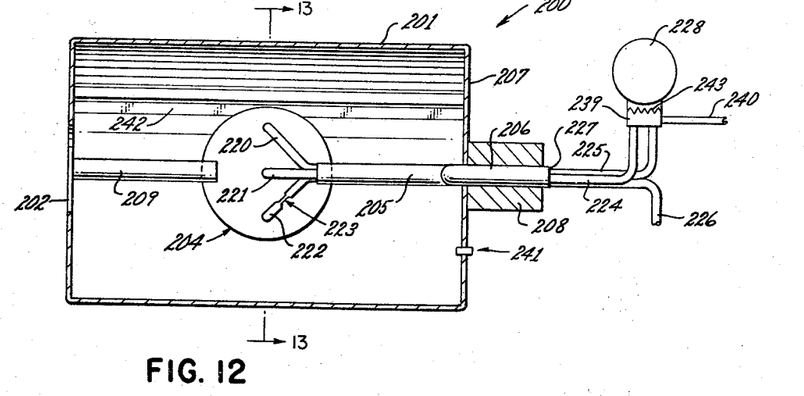
FIGURE 12 is a cross-sectional view of another embodiment of this invention and is taken on line 12—12 of FIGURE 13.

A nozzle or baffle means 204 is supported within the rotatable drum 201 by offset pipe means 205 having an end 206 passing through the center of the closed end wall 207 of the drum 201 and being rotatable in unison therewith while being supported in and rotated relative to a stationary bearing means 208 in the manner previously described for the embodiment illustrated in FIGURE 9. If desired, another supporting means for the nozzle or baffle means 204 can be utilized in the manner previously described and is indicated by the reference numeral 209 to support the baffle or nozzle means 204 to the front end wall 203 of the drum 201.

Figure 13:
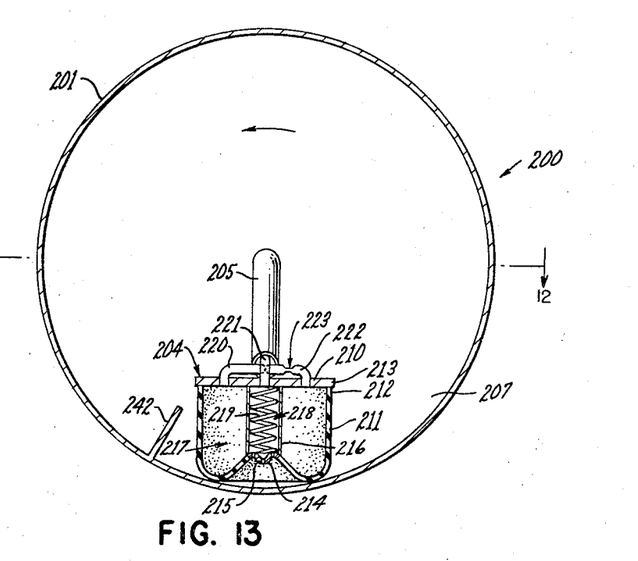
FIGURE 13 is an enlarged cross-sectional view taken on line 13—13 of FIGURE 12 and illustrates the apparatus in one of its operating positions.

As illustrated in FIGURE 13, the nozzle or baffle means 204 includes a rigid plate means 210 carrying a flexible member 211 and having its outer periphery 212 secured to the outer periphery 213 of the plate 210. The central part 214 of the flexible member 212 is provided with a plurality of openings 215 with the central part 214 being internally sealed from the flexible member 211 by a flexible member 216 extending between the perforated part 214 and the rigid end wall 210. In this manner, the nozzle means 204 defines an annular chamber 217 surrounding the inner flexible member 216 and being separated from an inner chamber 218 being disposed in fluid communication with the perforated part 214 of the flexible member 211. If desired, a compression spring 219 can be disposed in the chamber 218 and have its opposed ends thereof disposed against the rigid wall 213 and the foraminous or perforated portion 214 as illustrated.

The conduit member 205 internally carries three conduits 220, 221 and 222 with the conduits 220 and 222 being in fluid communication with the annular chamber 217 and the conduit 221 being in fluid communication with the chamber 218, the conduit 222 having a restriction means 223 therein for a purpose hereinafter described.

The conduits 220, 221 and 222, which are rotatable in unison with the drum 201, are adapted to cooperate with conduits 224, 225 and 226 which are stationary and extend into the end 227 of the supporting conduit means 205 in a manner hereinafter described, the conduit 224 normally leading to the inlet of a pumping means 228, the conduit 225 normally leading to the outlet of the pumping means 228 and the conduit 226 leading to a vent, drain or exhaust.

Figure 15:
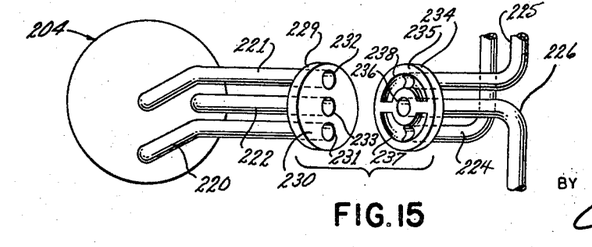
FIGURE 15 is a schematic view illustrating a valving function of the apparatus of FIGURE 12.

As illustrated in FIGURE 15, the right-hand end of the conduits 220, 221 and 222 are carried by a disc valve member 229 having its face surface 230 interrupted by ports 231, 232 and 233 respectively disposed in fluid communication with the conduits 220, 221 and 222. The port 233 is centrally located in the circular disc valve member 229 while the ports 231 and 232 are offset relative to the center of the disc member 29 and in diametrically opposed relationship to each other. A stationary disc valve member 234 has a face surface 235 disposed in sealing relationship with the face surface 230 of the rotatable valve member 229 and is secured to the left-hand ends of the conduits 224, 225 and 226. A central port 236 in the disc member 235 is disposed in fluid communication with the conduit 226 and a pair of arcuate diametrically offset and opposed port means 237 and 238 are formed in the face surface 235 of the disc member 234 and are respectively disposed in fluid communication with the conduits 224 and 225, the arcuate ports 237 and 238 of the stationary disc member 234 being adapted to cooperate with the ports 231 and 232 of the rotatable disc member 229 in a manner now to be described.

The housewife or the like disposes the desired quantity of laundry soap and the like into the drum 201 through the access opening 202 which can be subsequently closed. When the housewife turns on the apparatus 200 for a complete washing and drying cycle, suitable timer selector means and the like energizes a valve means 239 on the pump means 228 to interconnect a liquid supply line 240, such as water, cleaning fluid and the like, to the conduit 224 so that the treating fluid is directed through the arcuate port 237 of the stationary disc member 235 to force fluid through the port 230 in the rotary disc member 229 during the time the port 232 is aligned therewith, the port 232 being aligned with the arcuate port 237 during the entire time that the drum means 201 is locating the nozzle means 204 below the horizontal diameter of the drum 201 whereby such fluid will be introduced into the interior of the drum 201 and out through the openings 215 in the perforated part 214 of the nozzle means 204.

Since the drum 201 is in the position illustrated in FIGURE 13 during the fluid filling operation, a body of liquid is created in the drum 201 to the desired height through a timed operation to at least partially submerge the laundry in such body of liquid, any air pressure being created in the drum 210 during such liquid filling operation being expelled through a one-way check valve means 241 carried in the closed end wall 207 of the drum 201.

After the drum 201 has received the desired quantity of liquid therein, the main motor (not shown) is energized to rotate the drum 201 whereby the baffle means 204 and the baffle means 242 rotate in unison with the drum 201 and agitate the body of liquid and laundry therein in a manner sufficiently to provide a wash cycle therefor in the manner previously described.

After the wash cycle, a water removing cycle is created wherein the pump reversing valve 239 is actuated in any suitable manner to effectively interconnect the conduit 224 to the inlet side of the pump 228 and the conduit 225 to the outlet side thereof.

In this manner, as the drum 201 continues to rotate and the pump 228 is operating, each time the nozzle means 204 is rotating in the direction of the arrow in FIGURE 13 below the horizontal diameter of the drum 201, the pump 228 is creating a suction in the chamber 218 by the inlet means thereof and the pump 228 is creating pressure within the chamber 217 by the outlet means of the pump 228 with such pressure in the chamber 217 causing the flexible member 211 to expand downwardly to compress the aligned laundry against the drum 201 in the manner previously described. The fluid pressure being created in the chamber 217 in the pump 228 is subsequently passed out of the chamber 217 through the conduit 222 through restriction means 213 to the drain conduit 226 whereby the restriction means 213 maintains a pressure in the chamber 217 sufficiently for expanding the flexible member 211 for the clothes squeezing or compressing action previously described.

Figure 14:
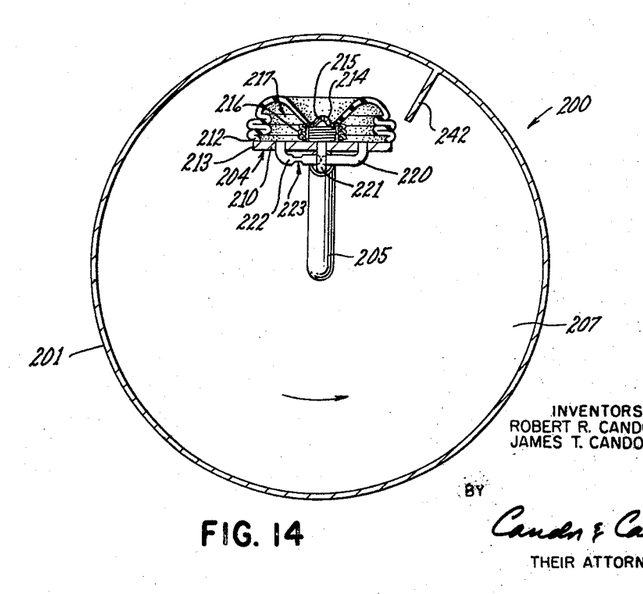
FIGURE 14 is a view similar to FIGURE 13 and illustrates the apparatus in another operating position thereof.

However, as the nozzle means 204 is being rotated above the horizontal diameter of the drum 201 in the manner illustrated in FIGURE 14, a reversing action takes place through the disc valve means 234 and 229 to interconnect the outlet side of the pump 228 to the chamber 218 to blow off any laundry engaging against the foraminous portion 214 thereof while the inlet side of the pump 228 is interconnected to the chamber 217 to cause the flexible member 211 to collapse away from the supporting drum 201 as illustrated in FIGURE 14 and permit the clothes to fall free from the nozzle means 204 to produce a different accumulation thereof which will again be engaged by the nozzle means 204 when the same rotates below the horizontal diameter of the drum 201.

Thus, as the drum 201 is rotating and the pump 228 is operating in the above manner, the body of liquid in the drum 201 is subsequently withdrawn therefrom through the nozzle means 204 and expelled out through the drain conduit 226.

As the body of liquid is subsequently withdrawn, the moisture or liquid remaining in the laundry is pulled therefrom by the direct suction of the nozzle means 204 against the laundry at the inlet means 214 of the nozzle means 204 as the same is rotating below the horizontal diameter of the drum 201 until all of the moisture from the laundry is removed by the action of the nozzle means 204 in the above manner if an intermediate rinse cycle or cycles are not required.

In order to induce heat into the interior of the drum 201 during the aforementioned drying operation, the outlet side of the pump 228 can include a heating means 242 in combination therewith so that not only is heated air supplied within the chamber 217 to heat the surface 211 in the nozzle means 204 during the time the nozzle means 204 is below the horizontal diameter of the drum 201 to heat the atmosphere within the drum 201, but also when the nozzle means 204 is above the horizontal diameter of the drum 201 in the manner illustrated in FIGURE 14, the heated air is directly expelled out of the openings 215 of the nozzle means 204 directly into the drum 201 to be subsequently drawn through the trapped laundry into the chamber 218 of the nozzle means 204 when the nozzle means 204 is below the horizontal diameter of the drum 201.

Therefore, it can be seen that the apparatus 200 of this invention readily compresses the laundry against the liquid retaining drum 201 when the nozzle means 204 is below the horizontal diameter of the drum 201 to tightly seal the inlet 214 of a suction means against the laundry so that the suction in the chamber 218 can sweep a large volume of air or fluid from the drum 201 through the top layer of compressed laundry into the chamber 218 to remove moisture through such trapped laundry. Thereafter, the nozzle means 204 is collapsed away from such trapped laundry in the manner illustrated in FIGURE 14 by having the flexible member 211 drawn inwardly toward the rigid member 210 while the nozzle outlet 214 is expelling fluid outwardly into the drum 201 to permit the laundry to fall therefrom and produce a new accumulation of clothes in the lower part of the drum 201 to be subsequently trapped by the nozzle means 204 when the same again moves below the horizontal body member of the drum 201.

In this manner, the moisture in the laundry can be completely removed by a suction action to dry such laundry.

While the various laundry machines have been previously described and illustrated as having the nozzle means thereof each provided with only one opening means surrounded by a pressurized flexible sheet means to hold the opening means in a sealed relation with the laundry disposed between such nozzle means and the supporting structure, it is to be understood that the various embodiments of this invention can have the nozzle means thereof provided with a plurality of such pressure sealing opening means regardless of whether each opening means is being utilized to direct fluid from the nozzle means into the aligned laundry or to draw the fluid from the aligned laundry into the opening means as previously described.

Figure 16:
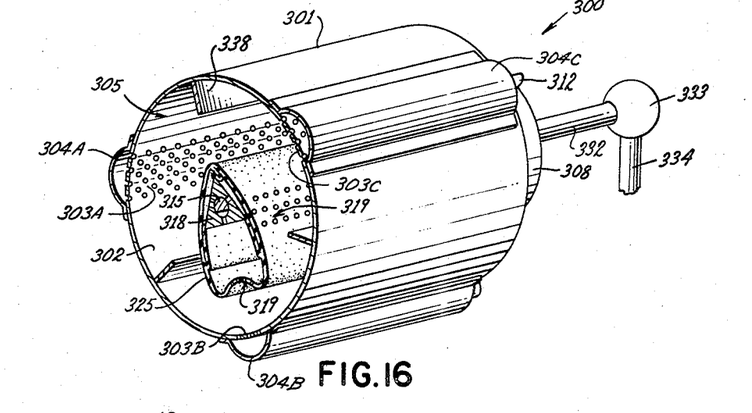
FIGURE 16 is a view similar to FIGURE 1 and illustrates another embodiment of this invention.
Figures 17, 18, 19:
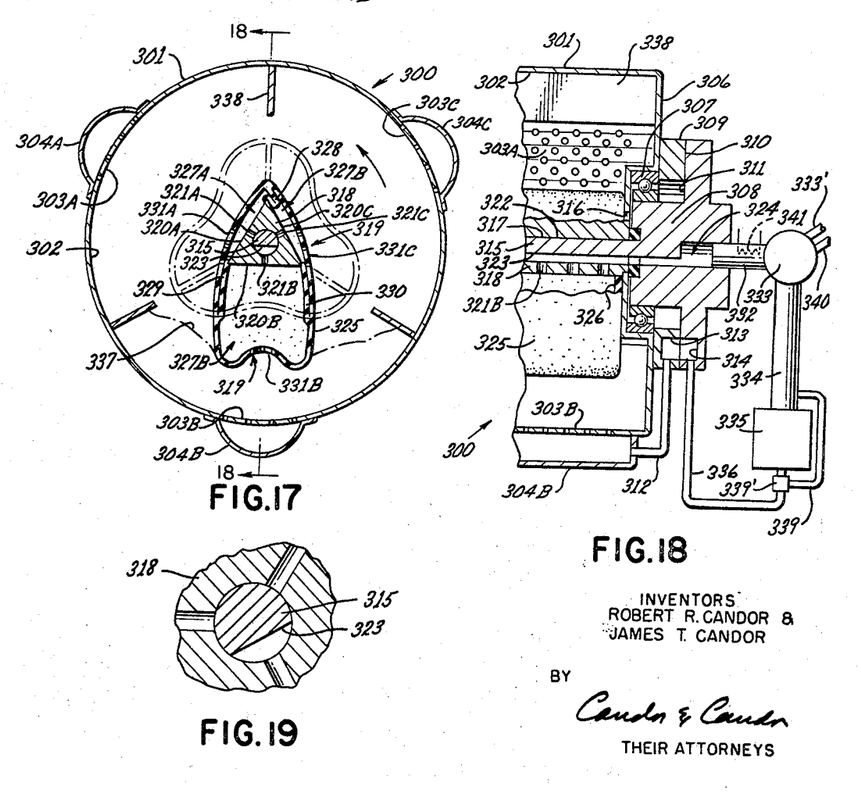
FIGURE 17 is a cross-sectional front view of the embodiment illustrated in FIGURE 16.
FIGURE 18 is a fragmentary cross-sectional view taken substantially on line 18—18 of FIGURE 17.
FIGURE 19 is an enlarged fragmentary cross-sectional view of another embodiment of the valve means for use with the apparatus of FIGURES 16–18.

For example, reference is now made to FIGURES 16–18 wherein another laundry apparatus of this invention is generally indicated by the reference numeral 300 and comprises a rotatably mounted liquid retaining drum means 301 for supporting and tumbling laundry therein. However, the inside surface 302 of the drum 301 has a plurality of longitudinal perforated sections 303A, 303B and 303C which in the embodiment illustrated in the drawings are spaced in equal distances about the inside circumference of the drum 301, each perforated section 303A–303C having the exterior side thereof sealed from the exterior of the drum 301 by respective trough-like members 304A, 304B and 304C secured to the drum 301 in any suitable manner.

Such perforated longitudinal sections and cooperating troughs are fully disclosed and claimed in the patent to Candor et al., No. 3,344,447, to which patent reference is now made for further details and use of such perforated sections and troughs as well as for further information concerning suitable means for sealing closed the front end 305 of the drum means 301 as well as for supporting such rotating drum means 301.

As illustrated in FIGURE 18, the drum 301 has a closed rear end wall means 306 rotatably mounted on a bearing means 307 supported on a stationary hub 308 whereby the drum 301 can be rotated relative to the stationary hub 308 by any suitable drive means, such as belts, gears, etc., in a manner well known in the art.

The end wall 306 of the drum 301 carries a valve member 309 that rotates in unison with the drum 301 and has a valve face 310 disposed in sliding and sealing relation with a valve face or part 311 formed on the stationary hub 308, such stationary valve part 311 and rotating valve part 309 being somewhat similar to the stationary valve part 234 and rotating valve part 229 previously described in connection with the embodiment of FIGURE 15.

Each trough 304A, 304B and 304C has the interior thereof fluidly interconnected to the valve member 309 by a respective conduit 312 as illustrated in FIGURE 18 with each such conduit 312 interconnecting the respective interior of its respective trough with a respective sector recess 313 in the valve member 309 that is adapted to cooperate with a sector recess 314 in the stationary valve part 311 as will be apparent hereinafter.

The stationary hub 308 has an extension 315 that projects through a central opening 316 in the rear wall 306 of the drum 301 and is telescopically received in a cylindrical opening 317 of a nozzle hub 318.

The nozzle hub 318 is secured to the drum 301 at the rear wall 306 thereof in any suitable manner so as to rotate in unison therewith on the stationary extension 315 of the stationary hub 308. However, the nozzle hub 318 and stationary extension 315 cooperate together to provide a valve means for a nozzle means of this invention generally indicated by the reference numeral 319.

In particular, the nozzle hub 318 has a substantially equilateral triangular cross-sectional configuration as illustrated in FIGURE 17 and is thus provided with three outwardly facing flat end surfaces 320A, 320B and 320C medially interrupted by a plurality of respective passages 321A, 321B and 321C leading to the cylindrical passage 317 in the hub 318. The stationary extension 315 of the stationary hub 308 has its outer periphery 322 disposed in substantially sealing relationship with the hub 318 except at a recess means 323 formed therein which communicates with a passage means 324A in the stationary hub 308.

Thus, it can be seen from FIGURE 17 that as the drum 301 rotates in a counterclockwise direction, as indicated by the arrow, the hub 318 likewise rotates in unison with the drum 301 whereby the passages 321A are sealed from the passage 324 of the hub 308 until the same come into alignment with the recess 323 in the extension 315 and stay in fluid communication therewith until the hub 318 is further rotated in a counterclockwise direction to have the outer peripheral surface 317 of the extension 315 again seal off the passages 321A. Accordingly, each end surface 320A, 320B and 320C has its exterior fluidly interconnected to the passage 324 of the hub 308 in substantially a sequential manner as the drum 301 rotates for a purpose hereinafter described.

The nozzle means 319 includes a flexible sheet means 325 arranged in tubular form around the hub 318 and having the opposed ends thereof completely sealed to the hub 318 as illustrated by the end wall 326 of the sheet means 325 in FIGURE 18, the tubular sheet means 325 being divided into three compartments 327A, 327B and 327C by intermediate walls 328, 329 and 330 formed of flexible material and respectively extending from equally spaced apart points on the inside surface of the tubular sheet means 325 to the apexes of the hub 318 as illustrated in FIGURE 17 to be secured thereto in order to completely seal the compartments 327A, 327B and 327C from each other while such compartments are respectively fluidly interconnected to the passage means 321A, 321B and 321C.

The tubular sheet means 325 is provided with three longitudinal perforated areas or sections 331A, 331B and 331C to respectively cooperate with the compartments 327A, 327B and 327C in forming outlet end means for such compartments in controlling the fluid flow therefrom as will be apparent hereinafter.

As illustrated in FIGURE 18, the passage means 324 of the stationary hub 308 is disposed in fluid communication with an outlet conduit means 332 of a suction pump 333 which has its inlet conduit means 334 disposed in fluid communication with the sector recess 314 of the stationary valve part 311 by means of a condensor 335 and conduit 336.

The operation of the apparatus 300 of this invention will now be described.

The housewife or the like disposes the desired quantity of laundry or the like into the drum 301 and initiates the operation of the laundry apparatus 300 whereby water or other treating liquid is directed into the interior of the drum 301 in any suitable manner, such as in the manner provided by the apparatus 200 previously described or by the means fully disclosed in the aforementioned patent to Candor et al., No. 3,344,447. For example, the water or other treating liquid can be directed from supply pipe 333' and pump through the nozzle means 319 with the interior of the drum 301.

In any event, after or during the accumulation of a suitable quantity of treating liquid in the drum 301, the drum 301 can be rotated in any desired manner in a counterclockwise direction whereby the laundry therein, as represented by the line 337 in FIGURE 17 is caused to rotate and tumble in the drum 301 in a conventional manner and can be assisted in such tumbling action by a plurality of inwardly directed baffle means 338 carried on the interior of the drum 301.

Such agitation of the laundry 337 in the drum 301 can be accomplished in the conventional manner without utilizing the nozzle means 319 in combination therewith. However, if it is desired that the nozzle means 319 be utilized in assisting the liquid in treating the laundry 337 for "agitation" purposes in either the wash cycle or rinse cycle or both, the pump means 333 can be turned on during such wash or rinse cycle to cause the pump 333 to draw treating liquid through the particular perforated section 303A, B or C and through an opened bypass means 339 around the condenser 335 into the pump 333 during the time each trough 304A, B or C is in fluid communication with the sector recess 314 whereby the liquid being pumped out of the pump 333 is redirected into the interior of the drum 301 through the nozzle means 319 of this invention.

In particular, as the fluid is being forced from the outlet conduit 332 into the recess 323 of the extension 315, the same will enter the particular compartment or compartments 327A, B or C that is disposed in fluid communication with such recess 323.

For example, in the position of the drum 301 in FIGURE 17, the recess 323 of the stationary extension 315 is disposed only in communication with the compartment 327B whereby the entire flow if liquid out of the pump 333 is directed into the compartment 327B and must exit from the same out through the perforated section 331B thereof back into the drum 301.

However, since the liquid bing directed into the compartment 327B of the nozzle means 319 is under pressure, the same acts against the inside surface 320B of the compartment 327B to force the tubular sheet means 325 between the walls 329 and 330 radially outwardly in the manner of the previously described nozzle constructions of this invention except that it can be seen that the troughs 304A, B and C respectively face the flat surfaces 320A, B and C of the hub 318 so as to cooperate therewith.

In particular, as the compartment 327B is being expanded downwardly by being in fluid communication with the recess 323, the laundry 337 is being compressed and squeezed between the tubular sheet means 325 and the perforated section 303B so that not only is the section of laundry confined between the pressurized compartment 327B and the perforated section 303B being compressed therebetween, but also the same is being placed into sealing relationship against the perforated section 303B to have the treating liquid drawn therethrough by the pump 333 and the laundry 337 is in sealing relationship against the perforated section 331B of the sheet means 325 to have the treating liquid directly forced into the same from the compartment 327B so that an almost fluid direct circuit is provided between the compartment 327B and the interior of the trough 304B cooperating therewith through the laundry 337 trapped therebetween.

In this manner, it is believed that by forcing the treating liquid through each section of laundry as it cooperates with an expanding compartment of the nozzle means 319 and the associated suction action of its respective trough means, the treating liquid more effectively cleans or treats the laundry.

It can be seen from the dash line configuration of the nozzle means 319 in FIGURE 17, that if each compartment 327A, B and C thereof were being simultaneously pressurized, the nozzle means 319 would be in a substantially uniform spaced relation about the hub 318. However, by so constructing the recess 323 in the stationary extension 315 so that the compartment means 327A, B and C will only be in fluid communication therewith during a segment of the rotation of the particular compartment about the stationary part 315, the pressurized compartment, such as compartment 327B illustrated in FIGURE 17, collapses the non-pressurized compartments 327A and 327C so that the expanded compartment 327B can extend all the way down to the inside surface of the drum 301 depending upon the amount of accumulation of laundry 337 trapped between the expanding compartment 327B and the perforated section 303B.

Further, by coordinating the various sectors 313 in the rotary valve member 309 with the recess 323 in the stationary part 315 of the hub 308, each trough 304A, B or C will only be interconnected to the inlet of the pump 333 at the same time that its respective nozzle compartment means 327A, B or C is being interconnected by the recess 323 at the outlet side of the pump 333.

After the treating liquid in the drum 301 has been removed in any suitable manner, such as being withdrawn out of the troughs 304A, B and C and not returned into the same, such as being directed by the pump 333 out a drain line 340 and not into the outlet line 332, the apparatus 300 can be utilized to dry the remaining wet laundry therein.

In particular, the valve means 339' can be changed to prevent the line 336 from being solely connected to the bypass 339 so that the line 339 is interconnected to the inlet side of the pump 333 only by means of the condenser 335. In addition, an electrical heater 341 that is disposed inside the conduit 332 can be energized whereby the operation of the pump 333 in the drying cycle will cause air to be drawn through the section of laundry aligned with the respective perforated sections 303A, B or C that has its respective trough 304A, B or C interconnected to the inlet side of the pump 333 while the cooperating compartment means 327A, B or C of the nozzle means 319 will be directing heated air against the trapped section of laundry 337 to again provide a substantially closed circuit of heated fluid flow through the particular trapped section of laundry between the expanded sheet means 325 and the cooperating perforated section 303A, B or C, the flow of air through the laundry sweeping and vaporizing the moisture in the laundry to be entrained in the air stream and passed through the condenser 335 to have moisture and vapor removed therefrom before being returned to the nozzle means 319.

Thus, it can be seen that during the drying cycle of the apparatus 300, the drum 301 is continuously rotated in a counterclockwise direction and the nozzle means 319 cooperates with the troughs 304A, B and C in directly directing the heated air through trapped sections of the laundry to dry the same in a manner not requiring a centrifuging operation on the wet laundry.

Further, it can be seen that during such drying operation, as well as during the aforementioned washing or rinsing cycles of the laundry, each particular compartment means 327A, B and C of the nozzle means 319 is only disposed in compressing relationship with the laundry trapped between the same and the inside surface of the drum 301 during a part of the rotational movement of such compartment so that once the particular compartment means 327A, B and C is disconnected from the recess 323 of the stationary part 315 of the hub 308, that particular compartment will be collapsed by the other adjacent expanded compartment so that the previously trapped laundry will now be free to tumble relative to that particular nozzle section and form a new accumulation of laundry to be trapped by another compartment of the nozzle means 319.

While the recess 323 of the stationary part 315 of the hub 308 is illustrated as being fluidly interconnected to a particular compartment when the same begins to reach an eight o'clock position in a counterclockwise direction and remains in fluid communication until the same moves to an approximately four o'clock position in a counterclockwise direction, such recess means 323 can be arranged to provide such fluid communication in any desired relationship with the horizontal. For example, see FIGURE 19 wherein the recess 323 has been formed so as to interconnect each compartment in a counterclockwise direction as it moves from approximately a seven o'clock position to a three o'clock position in a counterclockwise direction.

Figures 20, 21, 22:
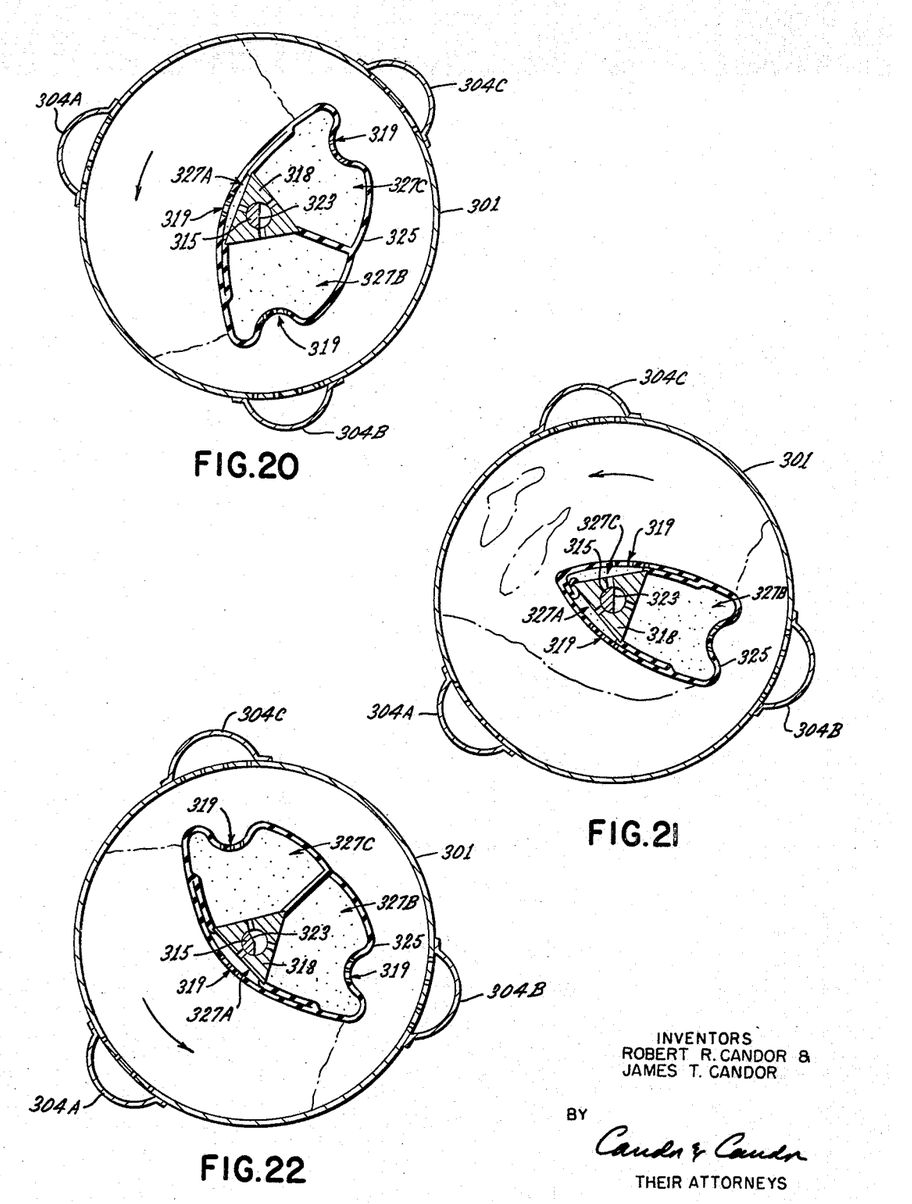
FIGURE 20 is a view similar to FIGURE 17 and illustrates another embodiment of this invention.
FIGURE 21 is a view similar to FIGURE 20 and illustrates another operating position of the apparatus of FIGURE 20.
FIGURE 22 is a view similar to FIGURE 20 and illustrates still another embodiment of this invention.

Also, it may be found that the internal baffle means 338 on the drum 301 can be completely eliminated and the multiple outlet nozzle means 319 could be utilized to insure the tumbling action within the drum 301 by merely arranging the recess 323 in the stationary part 315 of the hub 308 in the manner illustrated in FIGURES 20 and 21.

In particular, it can readily be seen in FIGURES 20 and 21 that recess 323 is substanially vertical and disposed on the right hand rising side of the rotating drum 301 whereby each compartment means 327A, B or C when pressurized will remain compressed against its respective section of laundry until such compartment means is substantially disposed in a twelve o'clock position and will be immediately collapsed just beyond the twelve o'clock position as illustrated in FIGURE 21 to permit the laundry trapped at the twelve o'clock position to be carried by inertia in a tumbling manner to the left and fall to the bottom of the drum 301 to be again compressed in a new accumulation thereof by a subsequently expanding compartment means of the nozzle 319. Of course, it is to be understood that such action of the nozzle means 319 in FIGURES 20 and 21 would be utilized during the wash and rinse cycle as well as during the drying cycle of the apparatus 300 and would permit the drum 301 to rotate at a very slow speed and still not require the internal baffles 338 illustrated in FIGURE 17.

Further, if it is found that the speed of rotation of the drum 301 is to be so slow that the actual twelve o'clock position for a release of an expanded compartment means of the nozzle 319 is not sufficient to carry the trapped laundry "over center," the valve surface 323 could be constructed in the manner illustrated in FIGURE 22 to fully assure that the expanded compartment of the nozzle 319 will not release from the trapped laundry until the same has reached the eleven o'clock position or beyond in a counterclockwise direction as illustrated.

In any event, it can be seen that the multiple compartments of the nozzle means 319 illustrated in FIGURES 16–22 readily permit relatively long dwells of fluid concentration on the trapped laundry and when utilized in combination with the troughs 304A, B and C, an additional action is created in the trapped laundry from the action of the nozzle means if such troughs 304A, B and C were not utilized as in the embodiments illustrated in FIGURES 1–15.

However, it is to be understood that the multiple compartment nozzle means illustrated in FIGURES 16–22 could be utilized with a perforated drum means without the troughs 304A, B and C in a manner similar to the drum 22 of FIGURE 1.

While the multiple nozzle means 319 of FIGURES 16–22 has been illustrated as having its hub rotating on the axis of rotation of the drum 301, it could be found that such axis of rotation of a multiple nozzle means could be at a position other than the axis of rotation of the drum 301.

Figure 23:
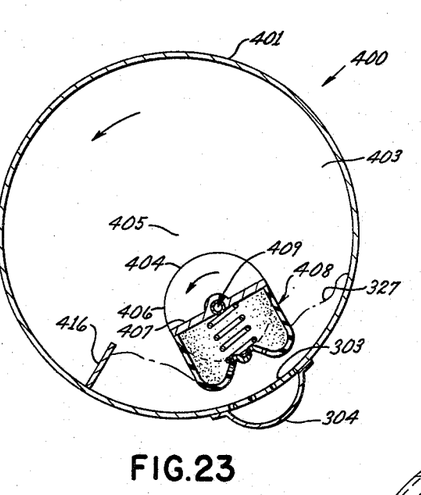
FIGURE 23 is a view similar to FIGURE 17 and illustrates another embodiment of this invention.
Figure 24:
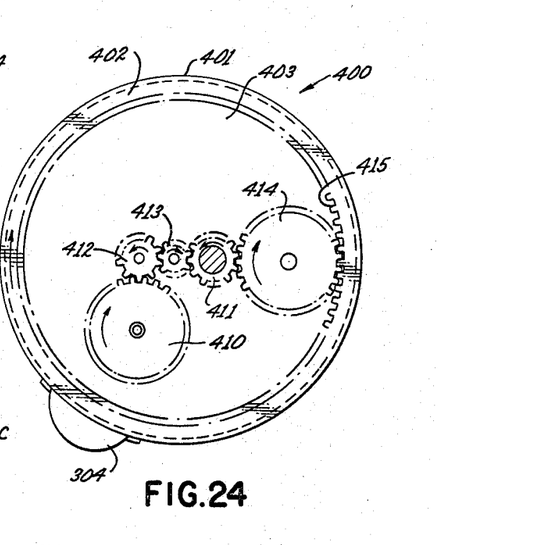
FIGURE 24 is a rear view of the apparatus of FIGURE 23.

For example, reference is now made to FIGURES 23 and 24 wherein another laundry apparatus of this invention is generally indicated by the reference numeral 400 and comprises a cylindrical liquid retaining drum 401 having its rear end 402 supported and rotatable on a stationary circular end plate 403, the drum 401 in FIGURE 23 having only one perforated section 303 similar to the section 303A previously described and cooperating with an associated trough 304 similar to the trough 304A.

The stationary end wall 403 has a circular opening 404 provided therein in offset relation to the center 405 thereof and in the embodiment illustrated in FIGURES 23 and 24 is disposed in the lower right-hand quadrant so as to be on the rising side of the drum when the drum is rotating in a counterclockwise direction as indicated by the arrow in FIGURE 23.

A circular plate 406 is rotatably mounted in the opening 404 of the stationary end wall 403 and carries a hub 407 of a flexible nozzle means 408 formed in substantially the same manner as the nozzle means 38A illustrated in FIGURES 6 and 7 so that further details thereof need not be described. However, it can be seen that the nozzle means 408 will rotate on an axis generally indicated by the reference numeral 409 in FIGURE 23 and the drum 401 will rotate on the axis in FIGURE 23.

The nozzle means 408 and drum 401 are rotated in such a manner that the nozzle means 408 will always cooperate with the trough 304 each time the trough is disposed in the position illustrated in FIGURE 23 so that the trough 304 and nozzle means 408 will cooperate together in the same manner as the nozzle means 319 and troughs 304A, B and C previously described.

Accordingly, it can be seen in FIGURE 24 that the plate 406 carrying the nozzle means 408 has a pinion gear 410 interconnected thereto external of the end wall 403 and is interconnected in a driving relationship to a main drive gear 411 by intermediate meshing pinion gears 412 and 413. In order to synchronize rotation of the nozzle 408 with the rotation of the drum 401 to cause the nozzle means 408 to cooperate with the trough 304 each time the trough 304 moves into the rising side of the drum 401, the drive gear 411 drives an appropriate pinion gear 414 disposed in meshing relation with a ring gear means 415 on the end 402 of the drum 401.

In this manner, the nozzle means 408 will cooperate with the perforated section 303 of the drum 401 to trap the aligned laundry 327 therebetween as previously described and will release the same without requiring a collapsing of the nozzle means 408 as the same rotates beyond the four o'clock position in a counterclockwise direction as illustrated in FIGURE 23 and will again pick up and compress against a section of laundry as the same begins to move into substantially the seven o'clock position in a counterclockwise direction. In order to insure a tumbling action in the drum 401 one or more internal baffle means 416 can be utilized.

While the nozzle means 408 of FIGURES 23 and 24 is only a single outlet means nozzle of the types previously described for FIGURES 1–15, it is to be understood that such nozzle means could be a multiple nozzle means in the manner of FIGURES 16–22, if desired.

Figure 25:
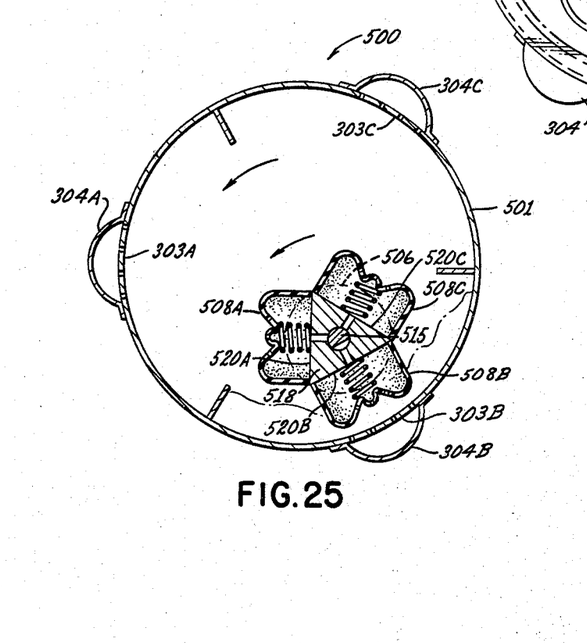
FIGURE 25 is a view similar to FIGURE 23 and illustrates still another embodiment of this invention.

For example, reference is now made to FIGURE 25 wherein another laundry apparatus of this invention is generally indicated by the reference numeral 500 and parts thereof similar to the apparatus 400 previously described are indicated by like reference numerals raised in value by 100.

In addition, the apparatus 500 has three perforated sections 303A, 303B and 303C and cooperating troughs 304A, 304B and 304C in the drum means 501 thereof similar to the drum 301 previously described. However, the plate means 506 carries a nozzle hub 518 similar to the nozzle hub 318 of FIGURE 17 except that circular cross-sectioned flexible nozzle means 508A, B and C are carried at the flat surfaces 520A, B and C thereof as illustrated with such nozzle means 508A, B and C cooperating with a stationary valve member 515 in a manner similar to the valve member 315 previously described.

Thus, it can be seen that the embodiments of this invention illustrated in FIGURES 16–25 not only provide means where multiple outlets can be provided on the nozzle means disposed inside the laundry containing drum means to assist in washing, agitating, rinsing and drying cycles on the laundry, but also such embodiments permit a cooperation with longitudinal passages on the outside of the supporting drum.

Of course, it is to be understood that the longitudinal passages or troughs on the outside of the drum could be pressurized to force fluid and/or liquid into the supporting drum while the inside nozzle means cooperating therewith could compress the laundry against such supporting structure while drawing the fluid from the laundry into the nozzle means as provided by the embodiment illustrated in FIGURES 12–15 previously described.

Also, the nozzle means and troughs could simultaneously direct fluid into the laundry trapped therebetween or simultaneously withdraw fluid from such trapped laundry, if desired.

What is claimed is:

1. Apparatus for treating laundry and the like comprising a confining means for receiving said laundry and supporting the same in said apparatus, a plurality of nozzle means carried by said apparatus and each having an end means provided with opening means, means for causing said laundry to have different sections thereof respectively and serially disposed between said end means of said nozzle means and said confining means, means for causing said end means of each said nozzle means to be disposed in substantially sealed relation with each of its said respective sections of said laundry, and means for causing a direct fluid flow between each said opening means and the particular section of laundry aligned between said respective opening means and said confining means to treat said particular section of laundry with said fluid, each said nozzle means comprising flexible sheet means at least partially surrounding its respective opening means and defining said nozzle end means thereof, said means for causing each said end means to be disposed in sealed relation with each of its said respective sections of laundry comprising means for imposing a fluid under pressure against one side of each said sheet means to cause the other side thereof to press against said laundry in said confining means.

2. Apparatus as set forth in claim 1 wherein said means for causing said direct fluid flow comprises a suction device operatively interconnected to said nozzle means to draw said fluid from said apparatus and through said particular section of laundry into said opening means of said nozzle means.

3. Apparatus as set forth in claim 1 wherein said means for causing said direct fluid flow comprises a pumping device operatively interconnected to said nozzle means to pump said fluid out through said opening means of said nozzle means and through said particular section of laundry into said apparatus.

4. Apparatus as set forth in claim 1 wherein said confining means is a liquid retaining means.

5. Apparatus as set forth in claim 4 wherein said nozzle means are adapted to direct treating liquid into said confining means to at least partially submerge said laundry in a body of said liquid in said confining means.

6. Apparatus as set forth in claim 5 wherein said nozzle means are adapted to withdraw said body of liquid from said confining means.

7. Apparatus as set forth in claim 1 wherein said means for imposing said fluid under pressure also defines said means for causing said direct fluid flow by forcing said fluid out through the respective opening means towards said laundry in said confining means.

8. Apparatus as set forth in claim 1 wherein said means for causing said direct fluid flow comprises suction means for drawing fluid from said apparatus through said particular section of laundry into its respective opening means of said nozzle means while its respective sheet means is being urged against said particular section of laundry by said pressure fluid.

9. Apparatus as set forth in claim 1 wherein said confining means has a plurality of fluid flow aperture means therein respectively alignable with said end means of said nozzle means, and means operatively interconnected to said aperture means to cause a direct fluid flow between each aperture means and the particular section of laundry aligned between said respective aperture means and the respective opening means of said nozzle means to treat said particular section of laundry with said fluid.

10. Apparatus for treating moisture bearing material bearing material and the like comprising a supporting means for receiving said material and supporting the same in said apparatus, said supporting means having a foraminous section, a nozzle means carried by said apparatus and having an end means provided with opening means, means for causing said material to have different sections thereof disposed between said end means of said nozzle means and said foraminous section of said supporting means, means for causing said end means of said nozzle means to be disposed in substantially sealed relation with each said section of said material, and means for causing a fluid flow between said opening means and said foraminous section substantially directly through the particular section of material aligned between said opening means and said foraminous section of said supporting means to treat said particular section of material with said fluid, said means for causing said direct fluid flow comprising means respectively and operatively interconnected to said nozzle means and to said foraminous section to respectively cause a pressure differential at said opening means of said nozzle means and at said foraminous section to act on said particular section of material.

11. Apparatus for treating moisture bearing material and the like comprising a supporting means for receiving said material and supporting the same in said apparatus, said supporting means having a foraminous section, a nozzle means carried by said apparatus and having an end means provided with opening means, means for causing said material to have different sections thereof disposed between said end means of said nozzle means and said foraminous section of said supporting means, means for causing said end means of said nozzle means to be disposed in substantially sealed relation with each said section of said material, and means for causing a fluid flow between said opening means and said foraminous section substantially directly through the particular section of material aligned between said opening means and said foraminous section of said supporting means to treat said particular section of material with said fluid, said means for causing said direct fluid flow comprising a suction device having its inlet operatively interconnected to said nozzle means to draw said fluid from said particular section of material into said opening means of said nozzle means and having its outlet operatively interconnected to said foraminous section to force said fluid through said foraminous section and into said particular section of material.

12. Apparatus for treating moisture bearing material and the like comprising a supporting means for receiving said material and supporting the same in said apparatus, said supporting means having a foraminous section, a nozzle means carried by said apparatus and having an end means provided with opening means, means for causing said material to have different sections thereof disposed between said end means of said nozzle means and said foraminous section of said supporting means, means for causing said end means of said nozzle means to be disposed in substantially sealed relation with each said section of said material, and means for causing a fluid flow between said opening means and said foraminous section substantially directly through the particular section of material aligned between said opening means and said foraminous section of said supporting means to treat said particular section of material with said fluid, said means for causing said direct fluid flow comprising a pumping device having its outlet operatively interconnected to said nozzle means to pump said fluid out through said opening means of said nozzle means and into said particular section of material and having its inlet operatively interconnected to said foraminous section to draw said fluid from said particular section of material through said foraminous section.

13. Apparatus for treating moisture bearing material and the like comprising a supporting means for receiving said material and supporting the same in said apparatus, said supporting means having a foraminous section, a nozzle means carried by said apparatus and having an end means provided with opening means, means for causing said material to have different sections thereof disposed between said end means of said nozzle means and said foraminous section of said supporting means, means for causing said end means of said nozzle means to be disposed in substantially sealed relation with each said section of said material, and means for causing a fluid flow between said opening means and said foraminous section substantially directly through the particular section of material aligned between said opening means and said foraminous section of said supporting means to treat said particular section of material with said fluid, said means for causing said direct fluid flow comprising suction means operatively interconnected to said nozzle means and to said foraminous section to respectively draw fluid from said particular section of material and into said opening means of said nozzle means and draw fluid from said particular section of material and through said foraminous section.

14. Apparatus for treating moisture bearing material and the like comprising a supporting means for receiving said material and supporting the same in said apparatus, said supporting means having a foraminous section, a nozzle means carried by said apparatus and having an end means provided with opening means, means for causing said material to have different sections thereof disposed between said end means of said nozzle means and said foraminous section of said supporting means, means for causing said end means of said nozzle means to be disposed in substantially sealed relation with each said section of said material, and means for causing a fluid flow between said opening means and said foraminous section substantially directly through the particular section of material aligned between said opening means and said foraminous section of said supporting means to treat said particular section of material with said fluid, said means for causing said direct fluid flow comprising pumping means operatively interconnected to said nozzle means and to said foraminous section to respectively force fluid through said opening means of said nozzle means and into said particular section of material and force fluid through said foraminous section and into said particular section of material.

15. Apparatus as set forth in claim 10 wherein said supporting means is a liquid retaining means.

16. Apparatus as set forth in claim 10 wherein said supporting means is a foraminous carriage and said foraminous section is a part of said foraminous carriage.

17. A method for treating moisture bearing material and the like comprising the steps of supporting said laundry on a supporting means, providing a plurality of nozzle means with each nozzle means having an end means provided with opening means, moving said material to cause said material to have different sections thereof respectively and serially disposed between said end means and said supporting means, moving said end means of each said nozzle means to be disposed in substantially sealed relation with each of its said respective sections of said material, and creating a direct fluid flow between each said opening means and the particular section of material aligned between said respective opening means and said supporting means to treat said particular section of material with said fluid, said step of moving said end means of each said nozzle means to be disposed in substantially sealed relation with each of its said respective sections of said material comprising the step of creating a pressure differential across a flexible sheet means of each said nozzle means that at least partially surrounds said opening means thereof and defines said end means of the respective nozzle means to cause one side of said sheet means to tend to press against said material on said supporting means.

18. A method for treating moisture bearing material and the like comprising the steps of supporting said laundry on a supporting means having a foraminous section, providing a nozzle means with said nozzle means having an end means provided with an opening means, moving said material to cause said material to have different sections thereof disposed between said end means of said nozzle means and said foraminous section of said supporting means, moving said end means of said nozzle means to be disposed in substantially sealed relation with said section of material, and creating a direct fluid flow between said opening means and said foraminous section substantially directly through the particular section of material aligned between said opening means and said foraminous section of said supporting means to treat said particular section of material with said fluid, said step for causing said direct fluid flow comprising the step of creating a pressure differential respectively at said opening means of said nozzle means and at said foraminous section to act on said particular section of material.

19. Apparatus for treating moisture bearing material and the like comprising a supporting means for supporting said material in said apparatus, a plurality of nozzle means carried by said apparatus and each having an end means provided with opening means, means for causing said material to have different sections thereof respectively and serially disposed between said end means of said nozzle means and said supporting means, means for causing said end means of each said nozzle means to be disposed in substantially sealed relation with each said section of its said respective sections of material, and means for causing a direct fluid flow between each said opening means and the particular section of material aligned between said respective opening means and said supporting means to treat said particular section of material with said fluid, each said nozzle means comprising flexible sheet means at least partially surrounding its respective opening means and defining said nozzle ends means thereof, said means for causing each said end means to be disposed in sealed relation with each of its said respective sections of material comprising means for creating a pressure differential across each said sheet means to cause one side thereof to tend to press against said material on said supporting means.

20. Apparatus as set forth in claim 19 wherein said means for causing said direct fluid flow comprises a suction device operatively interconnected to said nozzle means to draw said fluid from said apparatus and through said particular section of material into said opening means of said nozzle means.

21. Apparatus as set forth in claim 19 wherein said means for causing said direct fluid flow comprises a pumping device operatively interconnected to said nozzle means to pump said fluid out through said opening means of said nozzle means and through said particular section of material into said apparatus.

22. Apparatus as set forth in claim 19 wherein said means for creating said pressure differential across said sheet means also defines said means for causing said direct fluid flow by forcing said fluid out through said opening means towards said material on said supporting means.

23. Apparatus as set forth in claim 19 wherein said means for causing said direct fluid flow comprises suction means for drawing fluid from said apparatus through said particular section of material into said opening means of said nozzle means while said sheet means is being urged against said particular section of material by said pressure differential across said sheet means.

References Cited

UNITED STATES PATENTS

| 1,350,353 | 8/1920 | Bair | 68—183 X |
| 1,525,946 | 2/1925 | Mellor | 68—51 |

WILLIAM I. PRICE, Primary Examiner

U.S. Cl. X.R.

34—15, 22, 92; 68—20